(12) United States Patent
Huang et al.

(10) Patent No.: US 7,830,802 B2
(45) Date of Patent: Nov. 9, 2010

(54) METHOD FOR PREVENTING IP MULTICAST DATA STREAM TO OVERLOAD COMMUNICATION SYSTEM BY DISTINGUISHING ALL KINDS OF SERVICES

(75) Inventors: Jinhong Huang, Shenzhen (CN); Zhijian Feng, Shenzhen (CN); Ke Du, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 686 days.

(21) Appl. No.: 11/813,187

(22) PCT Filed: Jul. 29, 2005

(86) PCT No.: PCT/CN2005/001152

§ 371 (c)(1),
(2), (4) Date: Jul. 9, 2007

(87) PCT Pub. No.: WO2006/069511

PCT Pub. Date: Jul. 6, 2006

(65) Prior Publication Data

US 2008/0165681 A1    Jul. 10, 2008

(30) Foreign Application Priority Data

Dec. 29, 2004    (CN) .................... 2004 1 0103402

(51) Int. Cl.
*G08C 15/00*    (2006.01)

(52) U.S. Cl. .................... 370/235; 370/230; 370/231; 709/232; 709/238

(58) Field of Classification Search ............ 370/229, 370/230, 230.1, 231, 232, 233, 234, 235, 370/235.1, 236, 236.1, 236.2, 237, 238, 239, 370/240, 252, 253; 709/228, 230, 232, 238, 709/243

See application file for complete search history.

(56) References Cited

U.S. PATENT DOCUMENTS 6,483,832 B1 * 11/2002 Civanlar et al. ............. 370/390

(Continued)

FOREIGN PATENT DOCUMENTS

| JP | 2001-197110 A1 | 7/2001 |
| JP | 2004-320380 A1 | 11/2004 |

OTHER PUBLICATIONS

International Search Report for PCT/CN2005/001152 mailed Nov. 10, 2005.

*Primary Examiner*—Chi H Pham
*Assistant Examiner*—Weibin Huang
(74) *Attorney, Agent, or Firm*—Lowe Hauptman Ham & Berner LLP (57) ABSTRACT

According to the method for preventing IP multicast data stream from overloading the communication system by distinguishing multiple services, when a multicast data packet 'packet (key)' with its key value being 'key' reaches the forwarding layer, if it doesn't find the matching multicast route entry or matching multicast forwarding entry, and it satisfies the requirement of multicast protocol Assert state machine, then it searches for current-limiting policy list L (type, key) according to the key, and applies the searched current-limiting policy to multicast forwarding and packet up-sending. If it finds the matching multicast route entry and the protocol requests sending the multicast data packet to the protocol processor, the new multicast forwarding entry P_M (key) is formed with the current-limiting policy of distinguishing the service type(key), and P_M(key) is used to forward and up-send. The above-mentioned three current-limiting types may be used separately or combined freely.

16 Claims, 4 Drawing Sheets

U.S. PATENT DOCUMENTS

| | | |
|---|---|---|
| 6,598,034 B1 | 7/2003 | Kloth |
| 6,950,431 B1 * | 9/2005 | Nozaki et al. ............... 370/390 |
| 7,644,177 B2 * | 1/2010 | Kouvelas et al. ............ 709/238 |
| 2003/0099198 A1 * | 5/2003 | Kiremidjian et al. ..... 370/230.1 |

* cited by examiner fig. 1 fig. 2 fig. 3 fig. 4 fig. 5 fig. 6

METHOD FOR PREVENTING IP MULTICAST DATA STREAM TO OVERLOAD COMMUNICATION SYSTEM BY DISTINGUISHING ALL KINDS OF SERVICES

RELATED APPLICATIONS

The present application is based on, and claims priority from, Chinese Application Number 200410103402.0, filed Dec. 29, 2004, the disclosure of which is hereby incorporated by reference herein in its entirety.

TECHNICAL FIELD

The invention relates to the implementation of IP multicast in wired and wireless IP communication system, especially to a method for preventing multicast data stream with a large flow from overloading the communication system.

BACKGROUND ART

IP multicast technique effectively solves the problem of single-point transmitting and multi-point receiving, achieves highly efficient data transmission of point-to-multipoint in IP network, thereby greatly saving the network bandwidth and reducing the network load. As a communication method parallel to unicast and broadcast, the significance of multicast is not only limited to this. More importantly, the multicast feature of the network can be utilized to provide some new value-added services conveniently, such as the online live broadcast, network TV, distance education, distance medical treatment, internet radio, real-time video conference, etc. in the field of internet information service. Due to the above features, the IP multicast has a great application prospect in both wired network and wireless network.

In current IP communication system, there are two modes for achieving the route: 1. serial processing of protocol and forwarding; 2. parallel processing of protocol and forwarding. The mode of parallel processing of protocol and forwarding is commonly used in order to realize a fast forwarding. No matter which one of the two modes is used, the protocol and forwarding have to be processed by different processes. The complexity and CPU occupation rate of the protocol processing are much higher than those of the forwarding processing.

The data stream-driven feature of PIM-SM (Protocol Independent Multicast-Sparse Mode) will cause overload to the CPU, which will affect the performance of system. The reason is as follows:

For an IP communication device using the mode of serial processing of protocol and forwarding, when multicast stream drive happens, all the data packets will be handed into the multicast protocol for processing. If the multicast data stream is very large at the moment, CPU needs to process each data packet according to the multicast protocol, and it will occupy a large amount of CPU resources, causing a descent of performance of the whole system.

For an IP communication device using the mode of parallel processing of protocol and forwarding, there are two kinds of constructions: one is centralized construction; and the other is distributed construction. The forwarding in both of the two constructions is independent from the protocol, and operates on a specialized network processor. In the centralized construction, the protocol processor and forwarding processor share a same memory area; in distributed construction, the protocol processor and forwarding processor have their respective memory areas, and a communication between the boards exists. For the centralized parallel processing mode, the influence of the multicast stream drive on the system is close to that of the serial processing mode; but for the distributed parallel processing mode, the multicast stream drive will further cause overload of the communication between boards, which, if not handled properly, will cause even greater influence on the system.

Therefore, if a simple method for controlling flow in sending the multicast data stream to the CPU without distinguishing the multicast data stream is used, when different multicast service streams occur the stream drive at the same time, the multicast data stream with a large flow will inundate the multicast data stream with a small flow, resulting in a multicast forwarding interrupt.

Current limiting is a method for preventing overload of IP communication devices. However, a part of data packets will be inevitably lost due to the current limiting. IP multicast protocol is a kind of route protocol closely related to application. Different multicast service streams may have different demands on the forwarding service quality, therefore, the multicast data packets having different service qualities should adopt different current-limiting policies so as to minimize the negative effects of the current limiting.

SUMMARY OF THE INVENTION

The purpose of the invention is to provide a method for preventing IP multicast data stream from overloading communication system by distinguishing multiple services. The method of this invention can use corresponding policies based on distinguishing different multicast service streams so as to avoid the IP multicast data stream with a large flow from overloading IP communication devices.

In order to solve the technical problem above, the invention provides a method for preventing IP multicast data stream from overloading the communication system by distinguishing multiple services is provided, comprising the following steps:

(a1) a multicast data packet 'packet(key)' with a key value of 'key' reaches a forwarding layer, and does not find a matching multicast route entry, the multicast data packet 'packet (key)' is up sent to a protocol processor;

(a2) a protocol layer drives a protocol state machine according to the received multicast data packet to generate a multicast route forwarding entry M(key); meanwhile, the forwarding layer searches a current-limiting policy corresponding to the 'key' in configured multicast current-limiting policies, generates a temporary forwarding route entry T_M (key), and limits the current of the subsequent multicast data packet 'packet (key)' by using the forwarding route entry T_M(key) generated;

(a3) if the protocol layer can generate a normal forwarding entry M(key) with the key value of 'key', then this entry is synchronized to the forwarding layer, the forwarding layer updates T_M(key) with M(key), and turns to normal forwarding; otherwise, the forwarding layer continues to limit the current according to the accessory current-limiting policy of T_M(key), and decides when to end the current limiting.

Further, the method above can also have the following features: the forwarding flag of the temporary forwarding route entry T_M(key) generated in said step (a2) is N, the subsequent multicast data packet 'packet(key)' will be discarded.

In order to solve the technical problem above, this invention also provides a method for preventing IP multicast data stream from overloading communication system by distinguishing multiple services, comprising the following steps:

(b1) a protocol layer generates a multicast route entry M(key) according to a protocol state machine; if an up-sending flag Upsend is set in this entry, the next step is performed; otherwise, the M(key) is synchronized to a forwarding layer, the forwarding layer generates or updates a forwarding route list and enters into the normal route forwarding flow, and the multicast current control is ended;

(b2) the protocol layer searches a current-limiting policy corresponding to the 'key' in configured multicast current-limiting policies, and applies the policy to the M(key) to make it to be a P_M(Key) with the current-limiting policy, then synchronizes it to the forwarding layer;

(b3) when the forwarding layer receives the multicast data packet 'packet(key)', it finds the matching multicast route entry, if the forwarding condition is satisfied, it first forwards the 'packet(key)', and then limits the current in up sending the multicast data packet P_M(key) to the protocol processor according to its current-limiting policy.

Further, the method above can also have the following feature: a step (b4) is included following said step (b3): if the current-limiting policy of P_M(key) requests up sending the multicast data packet 'packet(key)' to the protocol processor, then return to perform step (b1) after up-sending.

Further, the method above can also have the following feature: in said step (b2), the up-sending flag Upsend' with the policy is obtained by applying the searched current-limiting policy to the up-sending flag Upsend, thus the corresponding P_M(key) is obtained.

Further, the method above can also have the following feature: in said step (b4), if the current-limiting policy also requests starting up the temporary current-limiting, then the multicast data packet 'packet(key)' is up sent to the protocol processor, and the subsequent related multicast data packets 'packet(key)' are discarded.

In order to solve the technical problem above, this invention also provides a method for preventing IP multicast data stream from overloading communication system by distinguishing multiple services, comprising the following steps:

(c1) a multicast data packet 'packet(key)' with a key value of 'key' reaches a forwarding layer, finds a matching multicast forwarding entry, and satisfies the requirement of multicast protocol Assert (assert mechanism) state machine;

(c2) the forwarding layer directly uses a preset assert mechanism current-limiting policy, and judges whether the policy requests up sending the 'packet(key)' to the multicast protocol processor, if yes, the data packet 'packet(key)' is up sent, and the protocol layer, according to the protocol state machine, forms a new multicast route entry which is then synchronized to the forwarding layer; if not, the multicast data packet 'packet(key)' is shielded.

Further, the method above can also have the following feature: said assert mechanism current-limiting policy is a fixed current-limiting method without distinguishing keys.

Further, the method above can also have the following feature: said assert mechanism current-limiting policy is the corresponding current-limiting policy searched according to the key value at the moment.

Further, the method above can also have the following feature: the method introduces a current-limiting flag which can distinguish the condition of the assert mechanism, said flag is set and cleared according to said assert mechanism current-limiting policy so as to prevent the multicast data packet for triggering the assert mechanism state machine from overloading the CPU in which the multicast protocol locates.

In order to solve the technical problem above, the invention also provides a method for preventing IP multicast data stream from overloading communication system by distinguishing multiple services, comprising the following steps:

(d1) a multicast data packet 'packet(key)' with a key value of 'key' reaches a forwarding layer, and the forwarding layer judges whether a matching forwarding route can be found; if yes, the next step is performed, otherwise, step (d8) is performed;

(d2) it is judged whether the forwarding condition is satisfied, if yes, the forwarding layer first enters into the normal forwarding flow to forward this 'packet(key)', then the next step is performed; otherwise, step (d6) is performed;

(d3) it is judged whether the protocol requests up sending the multicast data packet 'packet(key)' to the protocol processor, if yes, the forwarding layer up sends the 'packet(key)' to the protocol layer, then the next step is performed; otherwise, the current-limiting will not be carried out, and the process will be ended;

(d4) the protocol layer receives the multicast data packet 'packet(key)' up sent by the forwarding layer, and drives the protocol state machine to generate a new multicast route entry M(key); if an up-sending flag Upsend is set in the M(key), the next step is performed; otherwise, the M(key) is synchronized to the forwarding layer, the forwarding layer forwards the received multicast data packet 'packet(key)' according to the new multicast route entry M(KEY), ending;

(d5) the protocol layer searches the current-limiting policy corresponding to 'key' under this condition and applies it to the M(key), a P_M(key) with a current-limiting policy is obtained, which is then synchronized to the forwarding layer; the forwarding layer limits the current for up sending the multicast data packet to the protocol processor according to the current-limiting policy, ending;

(d6) whether the request of assert mechanism of the multicast protocol is satisfied is judged; if so, the next step is performed; if not, the multicast data packet 'packet(key)' is discarded, ending;

(d7) a preset assert mechanism current-limiting policy is used in the forwarding layer; if the 'packet(key)' is asked by the policy to be up sent to the protocol processor, the data packet 'packet(key)' is up sent, the protocol layer generates a new multicast route entry according to the protocol state machine and synchronizes it to the forwarding layer, then the forwarding layer performs forwarding and up-sending according to this new entry, ending; if the up-sending is not required by the policy, this multicast data packet 'packet (key)' is shielded, ending;

(d8) the multicast data packet is up sent to the protocol processor, the protocol layer drives the protocol state machine to generate a new multicast route entry; meanwhile, the forwarding layer searches the current-limiting policy corresponding to the 'key' under this condition, generates a temporary forwarding route entry T_M(key), and limits the current of the subsequent multicast data packet 'packet(key)' according to this entry;

(d9) if the new multicast route forwarding entry is generated, it is synchronized to the forwarding layer, the forwarding layer uses this entry to update the T_M(key), and enters a normal forwarding flow, ending; if the M(KEY) can not be generated, the forwarding layer continues to limit the current according to the accessory current-limiting policy of T_M (key), and decides what time to end the current limit according to the policy.

Further, the method above can have the following feature: in said step (d5), if the multicast data packet 'packet(key)' needs to be up sent to the protocol processor according to the current-limiting policy of P_M(key), return to perform step (d4) after up-sending; if an temporary current limit is requested to be started according to this current-limiting policy, the forwarding layer will discard the subsequent corresponding multicast data packets 'packet(key)'.

Further, the method above can also have the following feature: it also includes a method for configuring the multicast current-limiting policy:

(e1) different current limit requirements are obtained through an artificially defined or pre-defined policy algorithm, a multicast current-limiting policy list L1(type, key) indexed by the key 'key' and the current limit type 'type' is formed in the multicast protocol layer;

(e2) the formed multicast current-limiting policy is synchronized to the forwarding layer by the protocol layer;

(e3) a multicast current-limiting policy list L2(type, key) indexed by the key 'key' and the current limit type 'type' is formed in the forwarding layer;

Further, the method above can also have the following feature: in said steps (d7) and (d8), when the protocol layer generates a new multicast route entry, if this new entry is set with the up-sending flag Upsend, the protocol layer also searches the current-limiting policy corresponding to 'key' under this condition, and applies the current-limiting policy to the new route entry M(key), and a P_M(key) with a current-limiting policy is obtained and then synchronized to the forwarding layer.

Further, the method above can also have the following feature: the forwarding flag of the temporary forwarding route entry T_M(key) generated in said step (d8) is N, the subsequent multicast data packets 'packet(key)' will be discarded.

Further, the method above can also have the following feature: said assert mechanism current-limiting policy is a fixed current limit way which does not distinguish keys; or said assert mechanism is a corresponding current-limiting policy searched according to the value of 'key' under this condition.

It is known from above that by introducing the processing method of multicast current limit based on strategies in the invention, corresponding methods are adopted respectively by distinguishing different multicast service stream and according to different reasons that cause the multicast service stream to overload protocol CPU. Compared with the traditional PIM_SM multicast, it has the following advantages: A. overload of the whole IP communication device system resulted from multicast stream drive is prevented; B. the influence of the multicast protocol processing on the multicast forwarding is reduced, and the efficiency of multicast forwarding is promoted; C. the current-limiting method by distinguishing types of multicast service stream based on policy does not only prevent the interrupt of multicast streams with a small flow, wherein the current interrupt is formed because the current is limited and thus shielded, but also provides a current-limiting policy which is based on different characteristics and requirements of different service streams, and the flexibility of the system increases; D. burden of the communication device for processing multicast route is reduced due to the reasonable current limit, thus requests of the communication device on hardware, such as CPU and memory, will be reduced, thereby reducing the cost of devices.

PREFERRED EMBODIMENTS OF THE INVENTION

In the following, the method for preventing multicast data stream from overloading an IP communication system by distinguishing multiple services IP multicast data stream based on policy will be discussed in detail with reference to the attached drawings.

Figure 1:
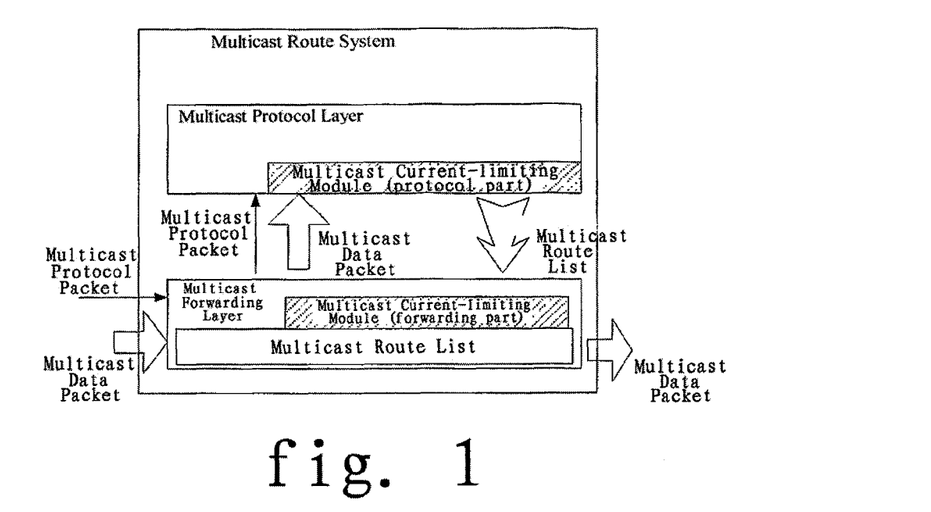
FIG. 1 is a schematic drawing of the multicast route system in accordance with embodiments of the invention.

As shown in FIG. 1, a traditional multicast route system includes a multicast forwarding layer and a multicast protocol layer. There is a multicast route list in the multicast forwarding layer, the multicast protocol packet and the multicast data packet can be received by the list, be forwarded according to a multicast route and can be up sent to the multicast protocol layer for processing if necessary. In the multicast protocol layer, the multicast data packet can be processed and a new multicast route list is formed and synchronized to the forwarding layer. In order to limit the current for up sending the multicast data packet to the protocol CPU, in this embodiment, a multicast current-limiting block is embedded into the system, and the block consists of a protocol part embedded into the multicast protocol layer and a forwarding part embedded into the multicast forwarding layer. The part of the multicast current-limiting block in the forwarding layer is mainly used to trigger and implement multicast route forwarding which is formed after using current-limiting policy. The part of the multicast current limit block in the protocol layer is used to form an IP multicast forwarding route list based on current-limiting policy which can distinguish multiple services. Regarding processing under different current-limiting conditions, this multicast current-limiting block can be divided into three sub-blocks, i.e., the first, second, third sub-block, each of which will be discussed in the following in detail. Additionally, a multicast current-limiting policy control block is also needed, which is used to complete the configuration of the current-limiting policy and generate on the protocol layer and the forwarding layer a multicast current-limiting policy list L1 (type, key) and a L2 (type, key), which use the key and the current limit type as the index, for call of the current limit sub-block. The purpose of the current-limiting policy is to decide whether to restrict he data packet whose service type is characterized in that its key is 'key' from being up sent to CPU and the granularity of its up-sending. The up-sending granularity is embodied in the function time of the current limit, the longer the current limit time, the greater the granularity of the current limit.

Multicast data use a source address and a group address as the key to perform the route forwarding. Meanwhile, different multicast service streams are distinguished through the source address and the group address, i.e., the multicast service stream type is distinguished through the key. In this embodiment, 'key' is used to search the policy, and thus, in different conditions when a current limit is required, the current limit can be applied by distinguishing different service streams. The specific current-limiting policy is defined and configured according to different network environments and different requirements.

Figure 2:
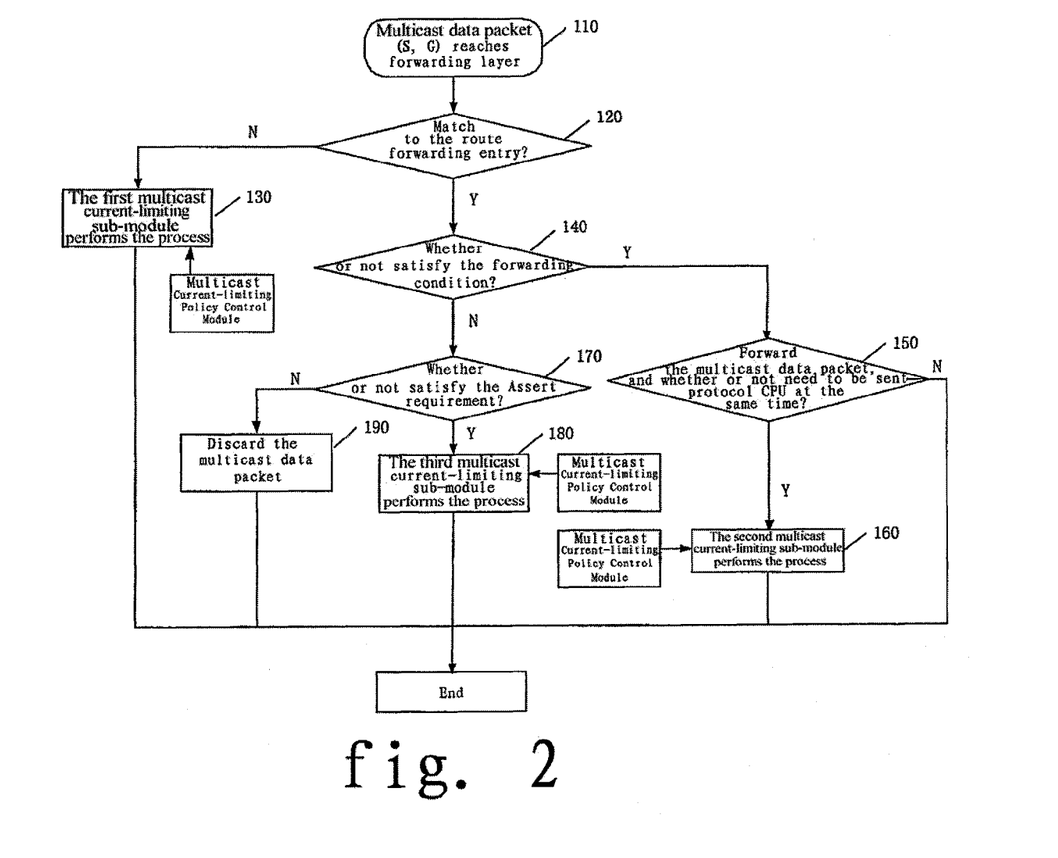
FIG. 2 is a schematic drawing of the whole processing method for current limit the in accordance with embodiments of the invention.

The reasons causing the multicast data packet being up sent to the protocol CPU are different, resulting in different current limit processing. In this embodiment, with respect to three reasons for up sending of the multicast data packet to the protocol CPU which may exist in IP multicast using PIM_SM protocol, different current limit sub-blocks are called to process. As shown in FIG. 2, the whole processing method of the current limit in this embodiment includes the following steps:

Step 110, a multicast data packet whose forwarding key is (S,G) reaches a multicast forwarding layer;

Step 120, first, the multicast route forwarding system decides whether a corresponding forwarding route can be matched according to the forwarding key of this multicast data packet; if it can not be matched, it means that the multicast forwarding entry used for this key has not been formed now, and it needs to make the multicast protocol layer generate suitable multicast forwarding route entry by way of multicast stream drive, and in this case, perform step 130; if the corresponding forwarding route can be matched, perform step 140;

Step 130, in order to limit the current for up sending the multicast data packet to the protocol CPU, the process is ended after calling the first multicast current limit sub-block to process (the first case in which a current limit is needed);

Step 140, continue to decide whether the forwarding condition is satisfied, for example, perform Rpf (reverse path forward) check; if so, perform step 150, otherwise, perform step 170;

Step 150, the multicast data packet is forwarded, and whether the forwarding entry itself still needs to be up sent to the protocol CPU while the data packet is forward is judged; if so, perform the next step; otherwise, the current limit is not needed, ending;

Step 160, the process is ended after calling the second multicast current limit sub-block to process (the second case in which the current limit is needed);

Step 170, if the forwarding entry is matched, whether the request of assert state machine is satisfied (this means that the Rtf check is not passed and a data packet is received at the out-interface) is judged; if so, the multicast data packet needs to be up sent to the protocol CPU, and the next step is performed; otherwise, step 190 is performed;

Step 180, the process is ended after calling the third multicast current limit sub-block to process (the third case in which the current limit is needed);

Step 190, the multicast data stream is discarded, ending.

In the three cases above, in order to achieve strategical multicast current limit, several sub-blocks of the multicast current-limiting block need to call the multicast current-limiting policy list. When calling, search is performed according to the current-limiting type in addition to the key. Current limit types are divided into three types, corresponding to three current limit conditions above respectively.

In the following, processing method of each multicast current-limiting sub-block will be discussed respectively in three cases causing the multicast data stream to overload CPU.

Figure 3:
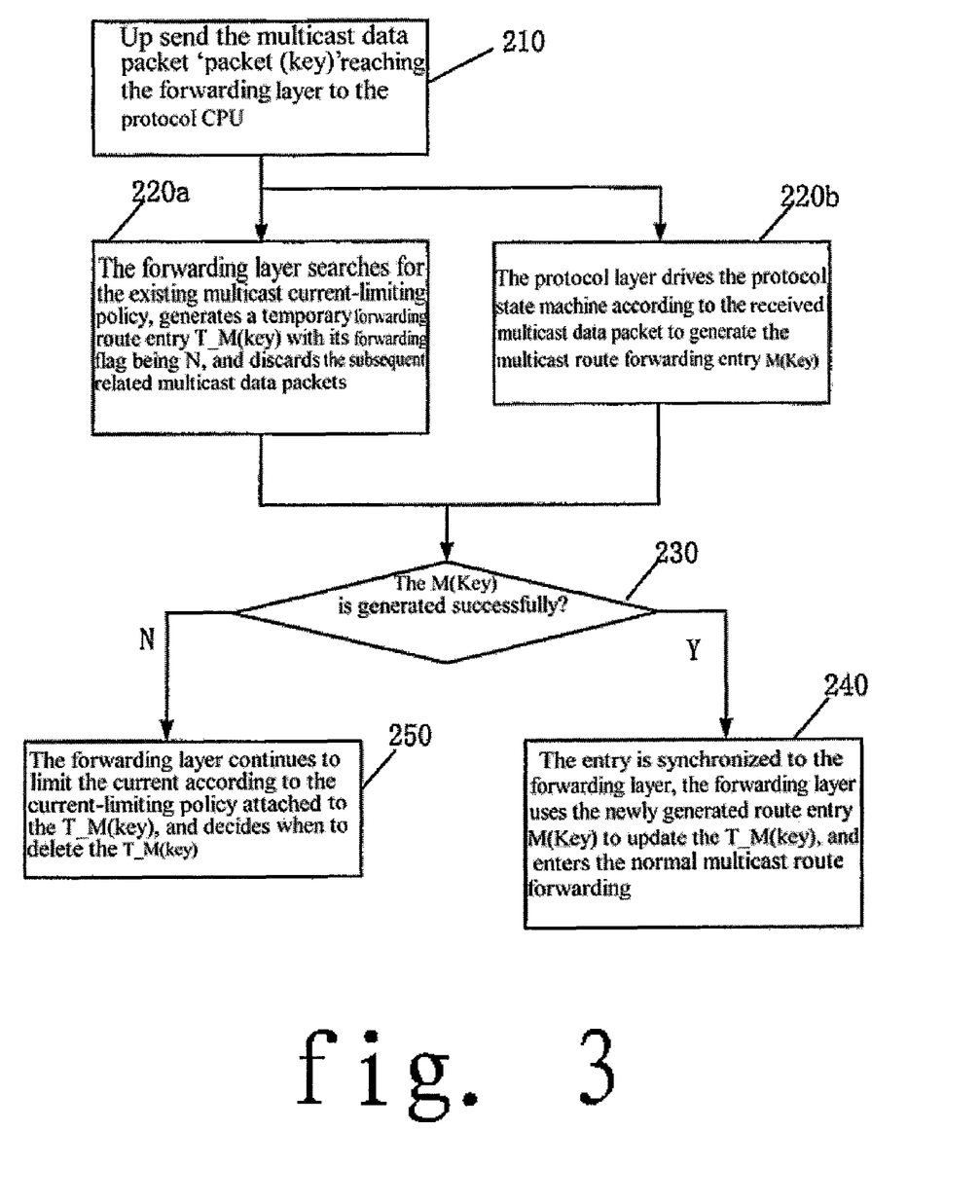
FIG. 3 is a flow chart of processing the first multicast current limit sub-block when there is no multicast forwarding entry in accordance with embodiments of the invention.

Case 1, a current-limiting method for the multicast data packet being up sent to protocol CPU because there is no multicast route entry.

Since this multicast forwarding data packet can not match with any multicast forwarding route entry, this multicast data packet needs to be given to the multicast protocol for processing, which is used to drive Register process of PIM_SM. Regarded from the route layer, at this moment, the multicast route list is generated not through the multicast protocol packet drive, but through the multicast protocol processing the multicast data packet. In this case, if the flow of the multicast data packet that satisfies the conditions above is very large, it will overload the CPU in which the multicast protocol exists. In order to solve this problem, the first multicast current limit sub-block will be processed according to the following steps as shown in FIG. 3, i.e., step 130 in FIG. 2 can be divided further into the following steps:

Step 210, the multicast data packet 'packet(key)' reaching the forwarding layer is up sent to the protocol CPU;

Subsequently, the forwarding layer and the protocol layer will perform processing at the same time:

Step 220a, the forwarding layer searches the multicast current-limiting policy list L2(type, key) according to the value of 'key' and the type of the current limit, and generates a temporary forwarding route entry T_M(key) with the in-interface of the current-limiting policy being Null and the forwarding flag being N, the subsequent related multicast data packets 'packet(key)' are discarded and not up sent to the protocol CPU, and current limit is achieved;

Meanwhile, step 220b, the protocol layer drives the protocol state machine according to the received multicast data packet to generate the multicast route forwarding entry M(key);

Step 230, if the normal forwarding entry M(key) with the key being 'key' can be generated, step 240 is performed, otherwise, step 250 is performed;

Step 240, this entry is synchronized to the forwarding layer, which uses a new generated M(key) route entry to update the T_M(key), and enters the normal multicast route forwarding, then the processing ends;

Step 250, when there is no new generated M(key) route entry, the forwarding layer continues to limit the current according to the accessory current-limiting policy of the T_M (key), and decides what time to delete the T_M(key) (such as after delaying time T) according to the policy, then the current limit is ended.

Obviously, by introducing a temporary multicast route list when the multicast forwarding is performed, and by strategical operating of the route list, the service stream can be distinguished, up-sending of multicast protocol process of the multicast data packet with a large flow is shielded, and the overload of CPU in which the multicast protocol exists is reduced.

Figure 4:
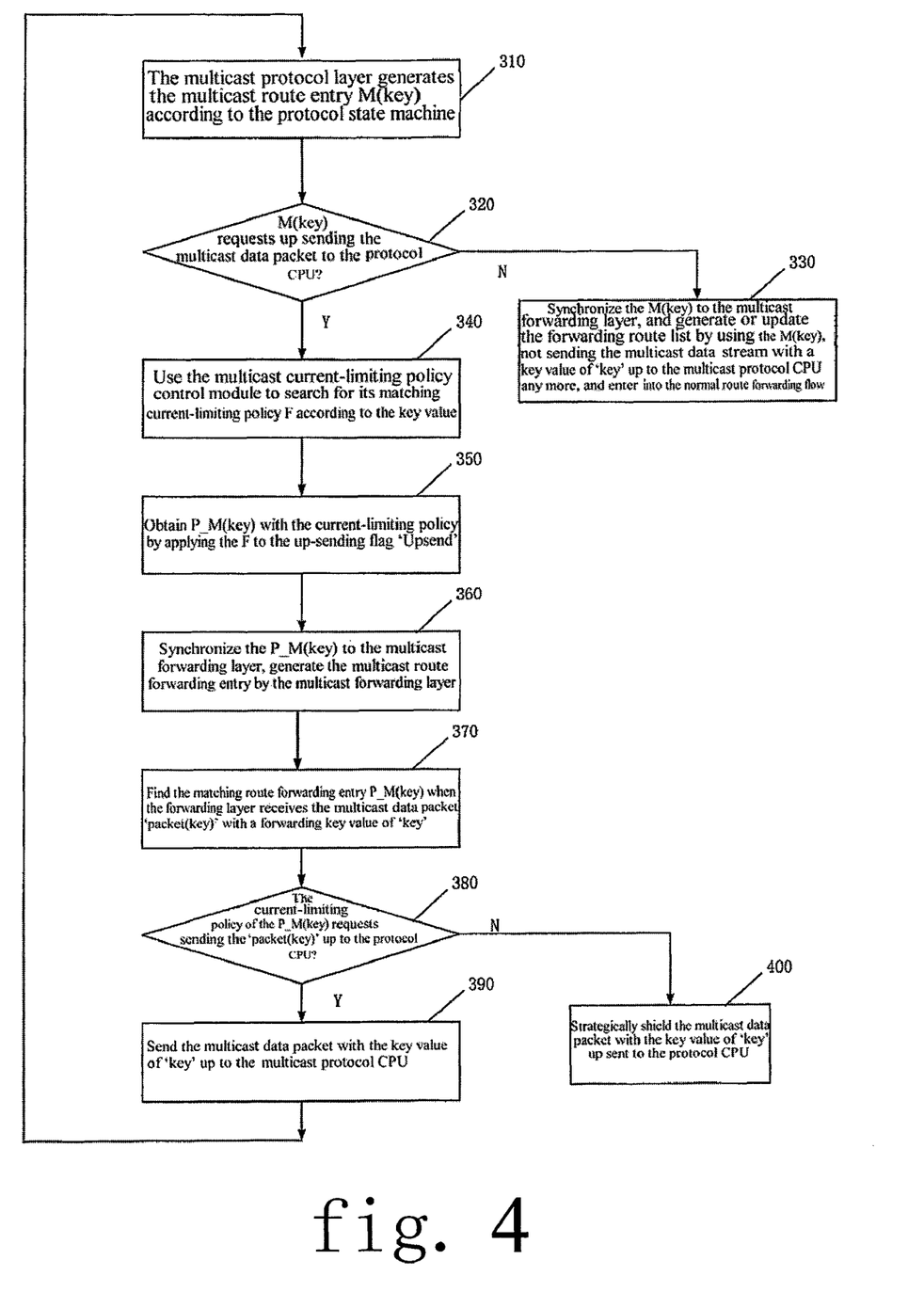
FIG. 4 is a flow chart of processing the second multicast current limit sub-block when there is a corresponding route entry but the normal multicast data packet needs to be up sent to the protocol CPU according to the protocol in accordance with embodiments of the invention.

Case 2, a current-limiting method for the multicast data packet up sent to protocol CPU because there is a corresponding multicast route entry but the normal multicast data packet needs to be up sent to the protocol CPU according to the protocol.

When the multicast forwarding data packet can match with the multicast route entry, the multicast data packet is forwarded according to certain rules. However, if the current multicast data packet is also requested to be processed by the multicast protocol according to the protocol, for example, when Spt and Rpt switch with each other, and if the current of the multicast data packet which satisfies the condition is very large, the CPU in which the multicast protocol exists will be overloaded. In this case, the second multicast current-limiting sub-block limits the current by distinguishing different multicast service streams through the following steps, as shown in FIG. 4:

Step 310, after receiving the data packet whose key is 'key', the multicast protocol layer generates the multicast route entry M(key) according to the protocol state machine;

Step 320, if this multicast route entry needs to inform the forwarding layer of up sending the multicast data packet whose key is 'key', i.e., a flag Upsend is set in the route entry M(key), step 340 is performed; if there is no flag Upsend in the route entry M(key), step 330 is performed;

Step 330, M(key) is synchronized to the multicast forwarding layer, a forwarding route list is generated or updated by using M(key), and entering a normal route forwarding flow; the multicast data stream whose key is 'key' will not be up sent to the multicast protocol CPU any more, and the multicast flow control is ended;

Step 340, the protocol layer looks for the current-limiting policy F matching the value of key according to the value of key and the current limit type search multicast current-limiting policy list L1(TYPE,KEY);

Step 350, a current-limiting policy F is applied to upsending flag Upsend to get an up-sending flag Upsend' with a policy, i.e., Upsend'=F(Upsend); accordingly, M(key) has become P_M(key) with a current-limiting policy;

The result of the current-limiting policy is whether to limit the current and the granularity of the current limit, which is represented here by setting and restoring the flag Upsend and the length of the time for setting. The flag Upsend is attached to the forwarding route list of this type of service data stream, and thus the forwarding layer is informed of whether to up send the data packet and how many data packets to send after receiving this type of data packet.

Step 360, P_M(key) is synchronized to the multicast forwarding layer, and after receiving the entry P_M(key), the multicast forwarding layer generates a multicast route forwarding entry;

Step 370, when receiving the multicast data packet 'packet (key)' with the forwarding key being 'key', the forwarding lay is matched to the route forwarding entry P_M(key);

Step 380, when forward the 'packet (key)' is performed, whether the 'packet (key)' needs to be up sent to the protocol CPU at the same time and whether to start the temporary current limit after up-sending is judged according to the current-limiting policy; if up-sending is needed, the next step is performed, otherwise, step 400 is performed;

Step 390, the multicast data packet whose key is 'key' is up sent to the multicast protocol CPU, return to step 310 and repeat the flow above, except that the content of the generated current-limiting policy and the used M(key) will be different; if this current-limiting policy still requires to start an temporary current limit, the forwarding layer will discard subsequent related multicast data packets 'packet(key)';

Step 400, the multicast data packet whose key is 'key' up sent to the protocol CPU will be shielded strategically.

Obviously, based on the traditional up-sending mechanism, the up-sending current-limiting policy of distinguishing service stream is introduced in the embodiment. The flag Upsend of the protocol is used to maintain the normal state machine, and the Upsend' synchronized to the forwarding layer by the protocol is a function of Upsend based on a certain policy F, i.e., Upsend'=F(Upsend). The function of preventing the multicast data stream from overloading the CPU in which the multicast protocol exists is implemented in this case by forwarding Upsend' having a certain kind of current-limiting policy.

Figure 5:
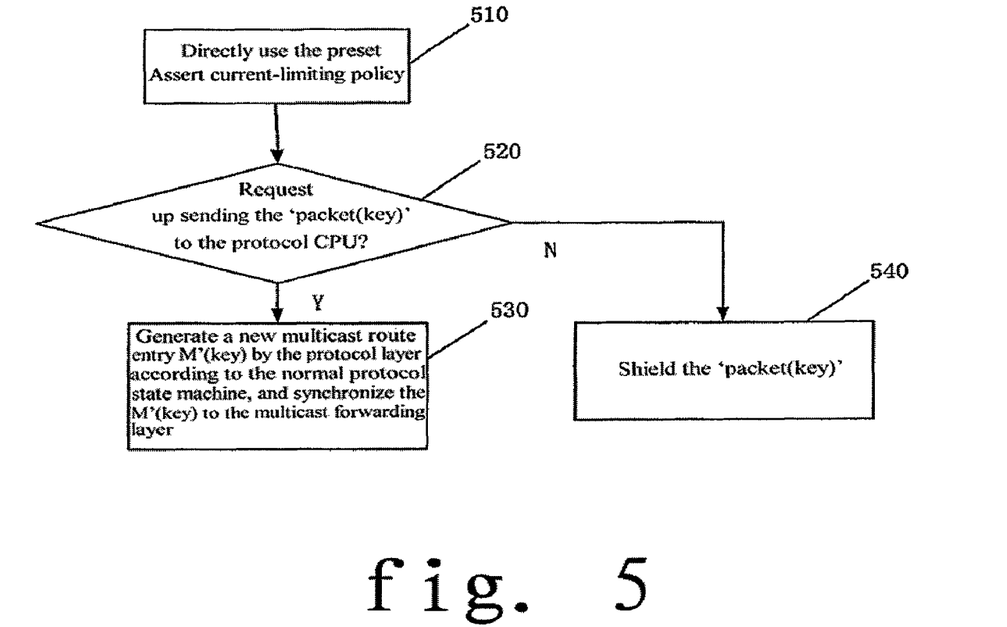
FIG. 5 is a flow chart of processing the third multicast current limit sub-block when there is a corresponding route entry and the multicast protocol Assert state machine requests that the multicast data packet is up sent to the protocol CPU in accordance with embodiments of the invention.

It needs to be explained that, in this embodiment, for the route entry generated in the protocol layer under the first condition (step 220b) or the subsequent third condition (step 530) or other conditions, if the condition for applying the second current-limiting policy is satisfied, i.e., M(key) has the flag Upsend, it is imparted with the second current-limiting flag Upsend' when generated, and at this moment M(key) becomes P_M(key). Then the P_M(key) is synchronized to the forwarding layer to be a forwarding entry.

Case 3, the current limit method for the multicast data packet up sent to the protocol CPU resulted from that the corresponding multicast forwarding entry is matched and the assert state machine of the multicast protocol is satisfied.

If the multicast data packet received by the multicast forwarding is matched to the multicast route entry, however, the interface at which the multicast data packet is received is not the in-interface of this route entry but the out-interface of this multicast route entry, Rpf check is not passed, i.e., the request of assert state machine of the multicast protocol is satisfied. This kind of multicast data packet will be handed to the multicast protocol to trigger the multicast state machine but not to be forwarded, and the multicast data packet may overload the multicast protocol CPU. In order to solve this problem, the third multicast current-limiting sub-block will operate according to the following steps in FIG. 5, i.e., the step 180 in FIG. 2 can be divided further into the following steps:

Step 510, the preset and configured Assert current-limiting policy is used directly in the forwarding layer. This policy can be fixed current limit without distinguishing key, and the corresponding current-limiting policy can also be obtained by searching multicast current-limiting policy list L2 (type, key) according to the value of key and current limit type when necessary;

Step 520, whether the policy requires that 'packet(key)' is up sent to the multicast protocol CPU is judged; if so, the next step is performed, otherwise, step 540 is performed;

Step 530, the multicast protocol layer receives the 'packet (key)', generates a new multicast route entry M'(key) according to normal protocol state machine, and synchronizes M'(key) to the multicast forwarding layer, which performs forwarding and up-sending according to this entry, ending;

Step 540, the 'packet(key)' is shielded, ending.

Specifically, a current-limiting flag which can distinguish the condition of Assert may be introduced when current limit is performed, and the flag can be set and cleared according to the set Assert current-limiting policy, thus preventing the multicast data packet used to trigger Assert state machine from overloading the CPU in which the multicast protocol exists.

Figure 6:
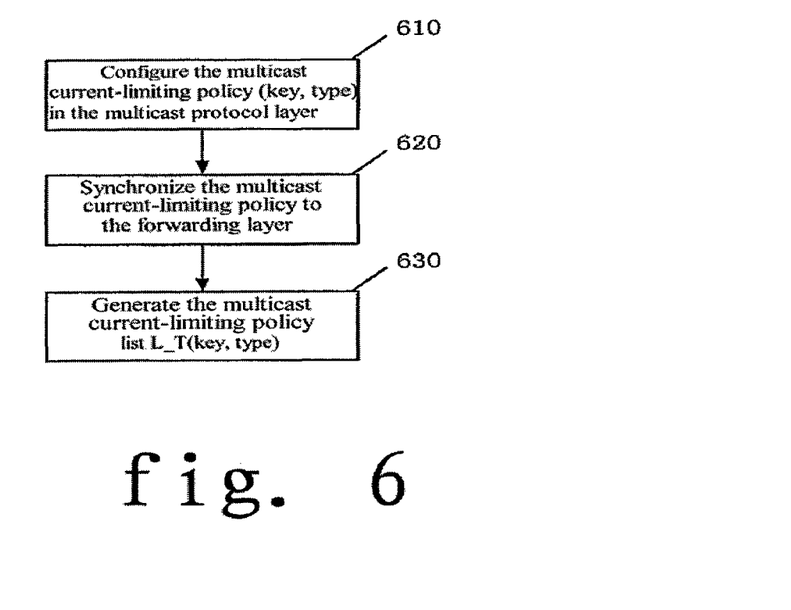
FIG. 6 is a schematic drawing of the process for configuring the multicast current-limiting policy in accordance with embodiments of the invention.

FIG. 6 illustrates a method for configuring the multicast current-limiting policy, including the following steps:

Step 610, the multicast current-limiting policy (type, key) distinguishing service streams is configured in the multicast protocol layer, and the multicast current-limiting policy list L1 (type, key) indexed with key and current limit type is formed in the protocol layer; the multicast current-limiting policy can be set with artificial configuration, and different current limit requirements can also be obtained through predefined policy algorithm; different current limit granularities are used for different service streams;

Step 620, the formed multicast current-limiting policy is synchronized to the forwarding layer by the protocol layer;

Step 630, the multicast current-limiting policy list L2(type, key) indexed with key and current limit type is formed in the forwarding layer.

In this embodiment, the current-limiting policy is applied to the multicast forwarding layer through two ways: one way is that the protocol layer applies the current-limiting policy directly to the related multicast route entry which will be synchronized to the forwarding layer, so that the route entry used for forwarding in the multicast forwarding layer has already been the entry having a current-limiting policy. This function is achieved by the second multicast current limit sub-block; the other way is that the multicast protocol synchronizes the current-limiting policy directly to the forwarding layer, the multicast current-limiting policy list L(type, key) is formed in the forwarding layer. The first and the third multicast current-limiting sub-blocks achieve current limit by calling this policy list.

Obviously, in this embodiment, when the multicast data packet 'packet(key)' reaches the forwarding layer, a different processing is performed according to the condition of the current multicast forwarding. For case 1 and case 3 above, the existing current-limiting policy L(type, key) is obtained by searching the multicast current limit list according to the value of key, the searched current limit is used in multicast forwarding and packet up-sending. For case 2 above, the new multicast route entry P_M(key) having distinguished service type (key) and current-limiting policy (L) is generated in the protocol layer and synchronized to the forwarding layer. Subsequently, in the forwarding layer, P_M(key) can be re-modified directly according to the policy by using the formed P_M(key) for forwarding and up-sending according to the value of key. Therefore, corresponding processing methods are found respectively for each case of overloading the protocol CPU resulted from stream drive in the processing of these three cases. However, the common point is that the corresponding current-limiting policy is adopted by distinguishing different multicast services.

It should be emphasized that for different use requirements and network environments, the current limit processing methods used in the three cases above can be used separately, or any two kinds of them can be used at the same time.

In another embodiment, it is only for case 1 above, i.e., the current limit is performed for the multicast data packet which is up-sent to the protocol CPU resulted from that there is no multicast route entry, the method is the same as that of the embodiment above.

In another embodiment, it is only for case 2 above, i.e., the current limit is performed for the multicast data packet which is up-sent to the protocol CPU resulted from that the protocol requests that the normal multicast data packet should be up-sent to the protocol CPU although there is a corresponding multicast route entry, the method is the same as that of the embodiment above.

In another embodiment, it is only for case 3 above, i.e., the current limit is performed for the multicast data packet which is up-sent to the protocol CPU resulted from that the corresponding multicast forwarding entry is matched and the assert state machine of the multicast protocol is satisfied, the method is the same as that of the embodiment above.

Additionally, although the embodiments above aim at the IP multicast using Protocol Independent Multiple Sparse Mode (PIM_SM), the invention can also be applied to communication devices (including wired and wireless) and IP protocols of various route processing modes without changing the protocol itself (i.e. without changing the state machine, processing flow, and packet format of the protocol).

In summary, compared with the prior art, the policy-based method of multicast current-limiting processing is incorporated into the invention. A corresponding current limit method is adopted respectively by distinguishing different multicast service streams and according to different reasons that cause multicast service stream to overload the protocol CPU. Compared with the traditional PIM_SM multicast, it has the following advantages: A. overload of the whole IP communication system due to the multicast stream drive is prevented; B. influence of the multicast protocol processing on the multicast forwarding is reduced, and the efficiency of multicast forwarding is increased; C. the policy-based current limit method of distinguishing multicast service stream type prevents the multicast stream with a small flow from breaking resulted from shielding due to the current limit, as well as provides different current-limiting strategies according to the characteristic and requirement of different service streams, and the flexibility of the system increases; D. burden of the communication device for processing multicast route is reduced due to the reasonable current limit, thus the requirement for the hardware, such as CPU and the memory, of the communication device is reduced, and the cost of the device decreases.

Practicability of Industry

The present invention can be used in a communication system using an IP multicast method, a corresponding policy is used by distinguishing different multicast service streams, and multi-service IP multicast data stream with a large flow is prevented from overloading IP communication devices.

What is claimed is:

1. A method for preventing IP multicast data stream from overloading communication system by distinguishing multiple services, comprising the following steps of:
   (a1) a multicast data packet 'packet(key)' with a key value of 'key' reaching a forwarding layer and not finding a matching multicast route entry, then up sending the multicast data packet 'packet(key)' to a protocol processor;
   (a2) driving a protocol state machine to generate a multicast route forwarding entry M(key) by a protocol layer according to the multicast data packet received; meanwhile, searching for a current-limiting policy corresponding to the 'key' in configured multicast current-limiting policies by the forwarding layer, generating a temporary forwarding route entry T_M(key), and limiting current of subsequent multicast data packets 'packet (key)' by using said temporary forwarding route entry T_M(key) generated;
   (a3) if the protocol layer being able to generate a normal forwarding entry M(key) with a value of 'key', synchronizing this entry to the forwarding layer, the forwarding layer updating T_M(Key) with M(Key), and entering into a normal forwarding; otherwise, the forwarding layer continuing to limit the current according to the current-limiting policy attached by the T_M(Key), and deciding when to end the current limiting.

2. The method of claim 1, wherein the forwarding flag of the temporary forwarding route entry T_M(key) generated in said step (a2) is N, and the subsequent multicast data packets 'packet(key)' will be discarded.

3. A method for preventing IP multicast data stream from overloading communication system by distinguishing multiple services, comprising the following steps of:
   (b1) generating a multicast route entry M(key) by a protocol layer according to a protocol state machine, performing the next step if the entry is set with an up-sending flag 'Upsend'; otherwise, synchronizing the M(key) to a forwarding layer, generating or updating a forwarding route list, entering into a normal route forwarding flow, and ending a multicast flow control;
   (b2) searching for a current-limiting policy corresponding to the key in configured multicast current-limiting policies by the protocol layer, applying the current-limiting policy searched to the M(key) to form P_M(key) attached with the current-limiting policy, then synchronizing it to the forwarding layer;

(b3) if a matching multicast route entry is found when the forwarding layer receives the multicast data packet 'packet(key)', and if the forwarding requirements are satisfied, then first forwarding the 'packet(key)', and achieving current limit for up sending the multicast data packet P_M(key) to the protocol processor according to the current-limiting policy of the multicast data packet P_M(key).

4. The method of claim 3, wherein said step (b3) is followed by a step (b4): returning to step (b1) after up-sending if the current-limiting policy of the P_M(key) requires sending up the multicast data packet 'packet(key)' to the protocol processor.

5. The method of claim 3, wherein in said step (b2), an up-sending flag Upsend' attached with the policy is obtained by applying the current-limiting policy searched out to the up-sending flag 'Upsend', thereby obtaining the corresponding P_M(key).

6. The method of claim 4, wherein in said step (b4), if the current-limiting policy also requests starting up a temporary current limiting, subsequent related multicast data packets 'packet(key)' will be discarded after the multicast data packet 'packet(key)' is up sent to the protocol processor.

7. A method for preventing IP multicast data stream from overloading communication system by distinguishing multiple services, comprising the following steps of:

(c1) a multicast data packet 'packet(key)' with a key value of 'key' reaching a forwarding layer and finding a matching multicast forwarding entry, with the requirements of an assert mechanism state machine of a multicast protocol being satisfied;

(c2) using a preset assert mechanism current-limiting policy directly in the forwarding layer, judging whether the policy requires up sending the 'packet(key)' to a multicast protocol processor, if yes, up sending the data packet 'packet(key)', then forming a new multicast route entry by the protocol layer according to a protocol state machine, synchronizing the new multicast route entry to the forwarding layer; if not, shielding the multicast data packet 'packet(key)'.

8. The method of claim 7, wherein said assert mechanism current-limiting policy is a fixed current-limiting mode which does not distinguish key values.

9. The method of claim 7, wherein said assert mechanism current-limiting policy is the corresponding current-limiting policy under the current condition which is searched out according to the key value.

10. The method of claim 7, wherein the method introduces a current-limiting flag which can distinguish the condition of the assert mechanism, set and clear the flag according to said assert mechanism current-limiting policy, and prevent the multicast data packet for triggering the assert mechanism state machine from overloading a CPU where the multicast protocol exists.

11. A method for preventing IP multicast data stream from overloading communication system by distinguishing multiple services, comprising the following steps of:

(d1) a multicast data packet 'packet(key)' with a key value of 'key' reaching a forwarding layer, the forwarding layer deciding whether a matching forwarding route can be found; if yes, performing the next step, otherwise, performing step (d8);

(d2) judging whether forwarding conditions are satisfied, if yes, the forwarding layer first entering a normal forwarding flow to forward the 'packet(key)', then performing the next step; otherwise, performing step (d6);

(d3) judging whether a protocol requires up sending the multicast data packet 'packet(key)' to a protocol processor, if yes, up sending the 'packet(key)' to a protocol layer by the forwarding layer, and performing the next step; otherwise, not performing current limiting, ending;

(d4) the protocol layer receiving the multicast data packet 'packet(key)' up sent by the forwarding layer, and driving a protocol state machine to generate a new multicast route entry M(key), if the M(key) is set with an up-sending flag 'Upsend', performing the next step; otherwise, synchronizing the M(key) to the forwarding layer, then the forwarding layer forwarding the received multicast data packet 'packet(key)' according to the new multicast route entry M(key), ending;

(d5) the protocol layer searching a current-limiting policy corresponding to the 'key' under this condition and applying it to the M(key) so as to obtain P_M(key) attached with the current-limiting policy, then synchronizing the P_M(key) to the forwarding layer, said forwarding layer achieving current limiting for up sending the multicast data packet 'packet(key)' to the protocol processor according to the current-limiting policy of the P_M(key), ending;

(d6) judging whether the requirements of an assert mechanism state machine of a multicast protocol are satisfied, if yes, performing the next step; if not, discarding the multicast data packet 'packet(key)', ending;

(d7) using a preset assert mechanism current-limiting policy in the forwarding layer, if the policy requires up sending the 'packet(key)' to the protocol processor, up sending the data packet 'packet(key)', generating a new multicast route entry according to the protocol state machine and synchronizing it to the forwarding layer by the protocol layer, then performing forwarding and up-sending according to this entry by the forwarding layer, ending; if the policy does not require up-sending, shielding the multicast data packet 'packet (key)', ending;

(d8) up sending the multicast data packet 'packet (key)' to the protocol processor, driving the protocol state machine to generate a new multicast route forwarding entry by the protocol layer; meanwhile, searching a current-limiting policy corresponding to the 'key' under this condition by the forwarding layer, generating a temporary forwarding route entry T_M(key), and limiting the current of subsequent multicast data packets 'packet (key)' according to this entry;

(d9) synchronizing the new multicast route forwarding entry to the forwarding layer if it is generated, using this entry to update the T_M(key) by the forwarding layer, and entering the normal forwarding flow, ending; continuing to limit current by the forwarding layer according to the current-limiting policy attached to the T_M (key) if the M(key) can not be generated, and deciding when to end the current limiting according to the policy.

12. The method of claim 11, wherein in said step (d5), if the current-limiting policy of the P_M(key) requires up sending the multicast data packet 'packet (key)' to the protocol processor, return to step (d4) after finishing up-sending; if the current-limiting policy also requires starting instant current-limiting, the forwarding layer will discard the subsequent related multicast data packets 'packet (key)'.

13. The method of claim 11, further including a method for configuring the multicast current-limiting policy as follows:

(e1) obtaining different current-limiting requirements through a policy algorithm artificially established or pre-defined, configuring a multicast current-limiting policy list L1 (type, key) with indexes of current-limiting type 'type' and key 'key' in the multicast protocol layer;

(e2) synchronizing the formed multicast current-limiting policy to the forwarding layer by the protocol layer;

(e3) forming a multicast current-limiting policy list L2(type, key) with indexes of key 'key' and current-limiting type 'type' by the forwarding layer.

14. The method of claim 11, wherein in said steps (d7) and (d8), when the protocol layer generates the new multicast route entry, if this new entry is set with a up-sending flag 'Upsend', the protocol layer also searches the current-limiting policy corresponding to the 'key' under this condition, and applies the current-limiting policy to the new route entry M(key) to obtain the P_M(key) with the current-limiting policy, then synchronizes the P_M(key) to the forwarding layer.

15. The method of claim 11, wherein the forwarding flag of the temporary forwarding route entry T_M(key) generated in said step (d8) is N, and the subsequent multicast data packets 'packet(key)' will be discarded.

16. The method of claim 11, wherein said assert mechanism current-limiting policy is a fixed current-limiting mode which does not distinguish keys; or said assert mechanism current-limiting policy is the corresponding current-limiting policy searched according to the value of key under this condition.

* * * * *